United States Patent

Tomi et al.

[11] Patent Number: 5,776,366
[45] Date of Patent: Jul. 7, 1998

[54] LIQUID CRYSTAL COMPOSITION AND ELECTRO-OPTIC DISPLAY DEVICE

[75] Inventors: Yoshitaka Tomi; Tetsuya Matsushita; Fusayuki Takeshita; Katsuyuki Murashiro; Etsuo Nakagawa, all of Chiba, Japan

[73] Assignee: Chisso Corporation, Osaka-fu, Japan

[21] Appl. No.: 741,720

[22] Filed: Oct. 31, 1996

[30] Foreign Application Priority Data

Nov. 2, 1995 [JP] Japan ..................... 7-310040

[51] Int. Cl.$^6$ ..................... C09K 19/30; C09K 19/52
[52] U.S. Cl. ..................... 252/299.63; 252/299.01
[58] Field of Search ..................... 252/299.01, 299.63; 349/182

[56] References Cited

FOREIGN PATENT DOCUMENTS 19520246  12/1995  Germany.
9622261   7/1996   WIPO.

Primary Examiner—Shean C. Wu
Attorney, Agent, or Firm—Wenderoth, Lind & Ponack, L.L.P.

[57] ABSTRACT

A chiral, nematic liquid crystal composition suitable to STN-LCD, having superior steepness, rapid response and being able to prevent occurrence of high order and low order domain of LCD, which composition contains as a first component, at least one compound expressed by the formula (1)

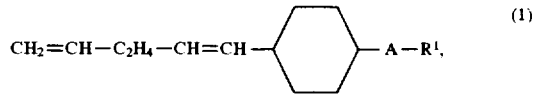

as a second component, at least one compound expressed by the formula (2)

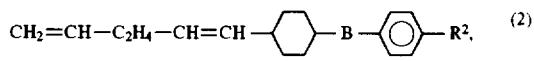

and as a third component, at least one compound of benzonitrile group,

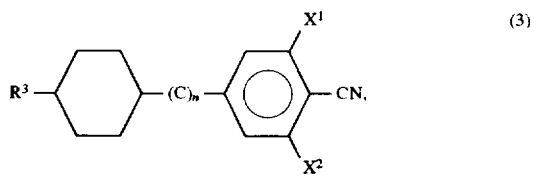

and further having a chiral dopant as a fourth component. In the above formulas, $R^1$ and $R^2$ each represent a linear alkyl group of 1 to 10 carbon atoms, A and B each represent trans-1,4-cyclohexylene or 1,4-phenylene, and $R^3$ represents a linear alkyl group of 1 to 10 carbon atoms, or a group wherein an optional —$CH_2$— or two or more not adjacent —$CH_2$—s present in the above group are replaced by —O— or —CH=CH—; $X^1$ and $X^2$ each independently represent H or F; C represents —COO—, —$C_2H_4$—, trans-1,4-cyclohexylene or 1,4-phenylene; and n represents 0 or 1, and as a fourth component, a chiral dopant in a quantity in which a ratio (d/p) of the thickness (dμm) of a liquid crystal layer in a liquid crystal cell to be filled with the liquid crystal composition to the helical pitch thereof (pμm) is 0.03 to 2.0.

6 Claims, No Drawings

LIQUID CRYSTAL COMPOSITION AND ELECTRO-OPTIC DISPLAY DEVICE

BACKGROUND OF THE INVENTION

1. Field of the Invention

This invention relates to a chiral nematic liquid crystal composition used in a sealed cell formed by two sheets of substrates each having a transparent electrode, in an electro-optic display device utilizing liquid crystals. More particularly, it relates to a chiral nematic liquid crystal composition suitable to super-twisted birefringence (STN) mode.

2. Background of the Invention

As the display mode of liquid crystal display device (LCD), twisted nematic (TN) mode, STN mode, active matrix (AM-LCD) mode, etc. have been proposed, and they have been successively practiced. Among these modes, STN mode having the alignment of liquid crystals in the upper and lower substrates twisted by 180° to 270° has been employed as LCD for personal computer, word processor, etc.

As the characteristics and conditions required for STN-LCD, the following ones are referred to:

(1) the activation temperature range is broadened.

(2) The optimum contrast is obtained.

(3) For realizing a high picture quality, contrast of LCD is elevated. Namely, the voltage-transmittance of LCD (steepness) is good.

(4) In order to prevent the afterimage (tailing) occurring at the time of scrolling of picture surface, the response time of LCD is made as fast as possible.

(5) High order and low order domains due to the twisted structure of liquid crystals are not generated.

As the physical properties required for liquid crystal compositions to meet with the above requirement (1), the nematic-isotropic phase liquid transition point (clearing point) should be high; with the above requirement (2), an adequate optical anisotropy should be given in accordance with the cell thickness of LCD; with the above requirement (3), the elastic coefficient ratio (K3/K1) should be high; with the above requirement (4), the viscosity should be low; and with the above requirement (5), an adequate helical pitch should be taken in accordance with the cell thickness of LCD.

At present, various liquid crystal compositions have been developed in accordance with the characteristics of STN-LCD. It is the present status that the properties of LCD have always been aimed to be improved, and accompanying this fact, liquid crystal compositions, too, have always been required to improve their characteristics, i.e. to improve their steepness and response.

SUMMARY OF THE INVENTION

The object of the present invention is to provide a chiral, nematic liquid crystal composition which is suitable to STN-LCD, has a superior steepness, and a rapid response, and prevents occurrence of high order and low order domain of LCD, and an electro-optic display device using the composition.

In order to solve the above problems, the present inventors have made extensive research on compositions using various liquid crystalline compounds. As a result, they have found that when the following chiral nematic liquid crystal composition of the present invention is used for STN-LCD, the above object can be achieved. The present invention will be described in details.

The first feature of the present invention consists in:

(1) A chiral nematic liquid crystal composition containing as a first component, at least one member of compounds expressed by the formula (1):

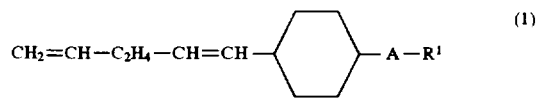

wherein $R^1$ represents a linear alkyl group of 1 to 10 carbon atoms, and A represents trans-1,4-cyclohexylene or 1,4-phenylene;

as a second component, at least one member of compounds expressed by the formula (2)

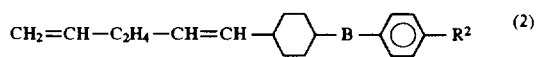

wherein $R^2$ represents a linear alkyl group of 1 to 10 carbon atoms and B represents trans-1,4-cyclohexylene or 1,4-phenylene, as a third component, at least one member of compounds expressed by the formula (3)

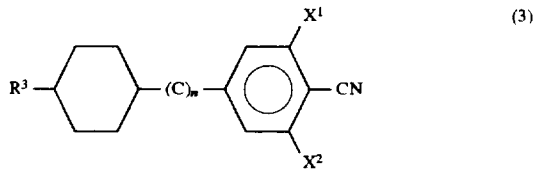

wherein $R^3$ represents a linear alkyl group of 1 to 10 carbon atoms, or a group wherein an optional —$CH_2$— or two or more not adjacent —$CH_2$—s present in the above group are replaced by —O— or —CH=CH—; $X^1$ and $X^2$ each independently represent H or F; C represents —COO—, —$C_2H_4$—, trans-1,4-cyclohexylene or 1,4-phenylene; and n represents 0 or 1, and as a fourth component, a chiral dopant in a quantity in which a ratio (d/p) of the thickness (dμm) of a liquid crystal layer in a liquid crystal cell to be filled with the liquid crystal composition to the helical pitch thereof (pμm) is 0.03 to 2.0.

The second feature of the present invention consists in (2) a chiral nematic liquid crystal composition according to the above item (1) containing 3 to 70% by weight of the first component, 3 to 50% by weight of the second component, and 3 to 80% by weight of the third component.

The third feature of the present invention consists in (3) a chiral nematic liquid crystal composition, characterized by further containing at least one member of compounds expressed by the following formulas (4) to (6) in addition to the chiral nematic liquid crystal composition according to the item (1) or item (2) described above:

wherein $R^4$ represents a linear alkyl group of 1 to 10 carbon atoms, a linear alkenyl group of 2 to 10 carbon atoms, a linear alkenyl group of 2 to 10 carbon atoms or a group wherein an optional —$CH_2$— or two or more not-adjacent —$CH_2$—s present in the above groups are replaced by —O—; $R^5$ represents F, a linear alkyl group of 1 to 10 carbon atoms, a linear alkenyl group of 2 to 10 carbon atoms or a group wherein an optional —CH$_2$— or two or more not-adjacent —CH$_2$—s present in the above groups are replaced by —O—.

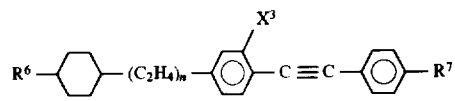

wherein $R^6$ and $R^7$ each independently represent a linear alkyl group of 1 to 10 carbon atoms; $X^3$ represents H or F; and n represents 0 or 1.

wherein $R^8$ and $R^9$ each independently represent a linear alkyl group of 1 to 10 carbon atoms or a linear alkenyl group of 2 to 10 carbon atoms; or a group wherein one optional —CH$_2$— or two or more not-adjacent —CH$_2$—s present in the groups are replaced by —O—; D and E each independently represent trans-1,4-cyclohexylene, 1,4-phenylene or 1,3-pyrimidine-2,5-diyl; and n represents 0 or 1.

The fourth feature of the present invention consists in (4) an electro-optic display device containing a chiral nematic liquid crystal composition described in either one of the above items (1) to (3).

The respective compounds constituting the liquid crystal compositions of the present invention will be described below.

The compounds constituting the first component and expressed by the formula (1) have a high K3/K1 and a low viscosity; hence it is particularly effective for improvement of STN-LCD characteristics, in short, for the object of improving steepness and increasing the response rate.

As the compounds expressed by the formula (1), those expressed by the following formulas (1a) or (1b) are particularly preferred:

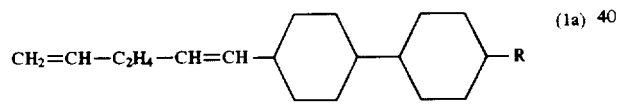

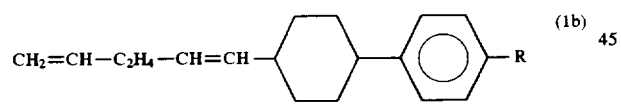

wherein R repesents a linear alkyl group of 1 to 10 carbon atoms.

In the chiral nematic liquid crystal composition of the present invention, the content of the first component is preferably 3% by weight or more, from the view point of improving the steepness and the response rate of STN-LCD, and the content is preferably 70% by weight or less from the viewpoint of not lowering the clearing point of the composition (the upper limit of the nematic range). It is more preferably 3 to 40% by weight.

The compounds constituting the second component and expressed by the formula (2) have a high K3/K1 and a low viscosity and further a clearing point of high temperature; hence the compounds are particularly effective for broadening the range of the liquid crystal phases of the composition toward the high temperature side.

As the compounds expressed by the formula (2), the compounds expressed by the following formulas (2a) or (2b) are particularly preferred:

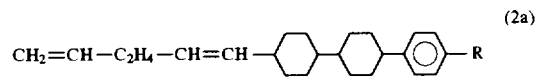

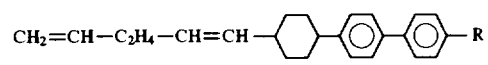

wherein R represents a linear alkyl group of 1 to 10 carbon atoms.

In the chiral nematic liquid crystal composition of the present invention, the content of the second component is preferably 3% by weight or higher from the viewpoint of improving the steepness and the response rate of STN-LCD, and it is preferably 50% by weight or lower from the viewpoint of securing the nematic condition of the composition even at low temperatures. It is more preferably 3 to 30% by weight.

The compounds constituting the third component and expressed by the formula (3) have a positive value of the dielectric anisotropy ($\Delta\varepsilon$); hence it is effective for adjusting the threshold voltage influencing the drive voltage of STN-LCD.

As the compound expressed by the formula (3), compounds expressed by the following formulas (3a) to (3j) are particularly preferred:

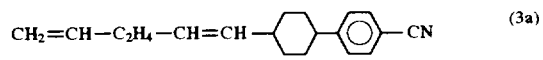

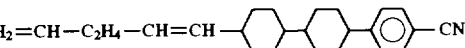

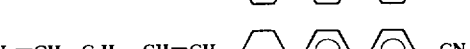

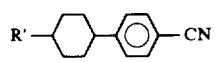

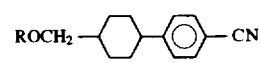

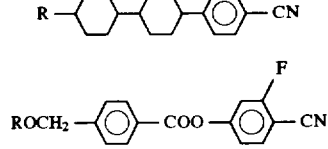

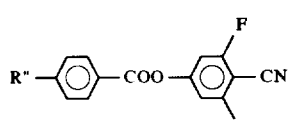

In these formulas, R represents a linear alkyl group of 1 to 10 carbon atoms; R' represents a linear alkenyl group of 2 to 10 carbon atoms or a linear alkyl group of 1 to 10 carbon atoms; and R" represents a linear alkenyl group of 2 to 10 carbon atoms.

In the chiral nematic liquid crystal composition of the present invention, the content of the third component is preferably 3% by weight or more from the viewpoint of adequately surpressing the threshold voltage of the composition in order to carry out a low voltage drive, and the content is preferably 80% by weight or less from the viewpoint of keeping the viscosity of the composition down to a low one. It is more preferably 3 to 70% by weight.

The chiral dopant constituting the fourth component is effective for preventing occurrence of higher order or lower order domain originating from the twisted structure of the liquid crystal composition. The content of the chiral dopant is preferred to add it so that the ratio (d/P) of the cell thickness value (d) to the helical pitch value (P) of the used liquid crystal composition can be 0.03–2.0.

As the chiral dopant, compounds expressed by the following formulas (C-1) to (C-3):

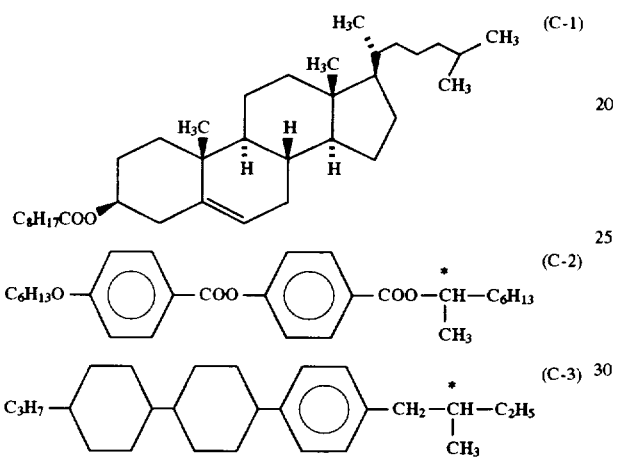

If necessary, it is possible to further add compounds expressed by the following formulas (4) to (6) to the chiral nematic liquid crystal composition of the present invention:

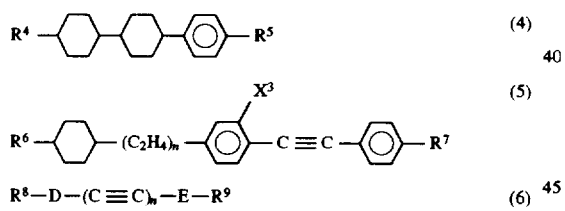

As the compounds expressed by the formula (4), which constitute the third component of the chiral nematic composition of the present invention, compounds expressed by the following formulas (4a) or (4b) are particularly preferable:

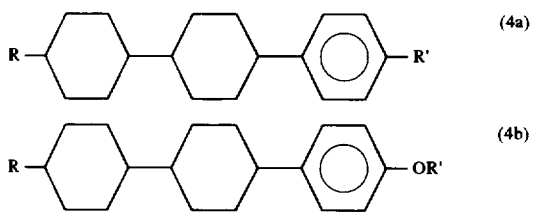

wherein R and R' each independently represent a linear alkyl group of 1 to 10 carbon atoms.

As the compounds expressed by the formula (5), compounds expressed by the following formulas (5a) or (5b) are particularly preferable:

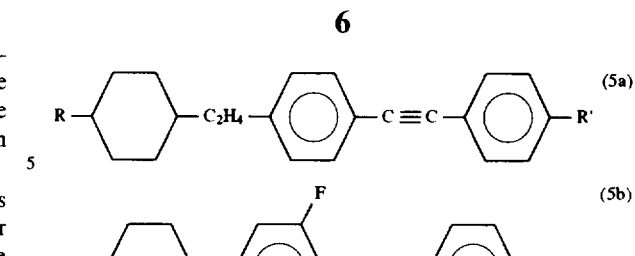

wherein R and R' each independently represent a linear alkyl group of 1 to 10 carbon atoms.

As the compounds expressed by the formula (6), compounds expressed by the following formulas (6a) to (6g) are particularly preferable:

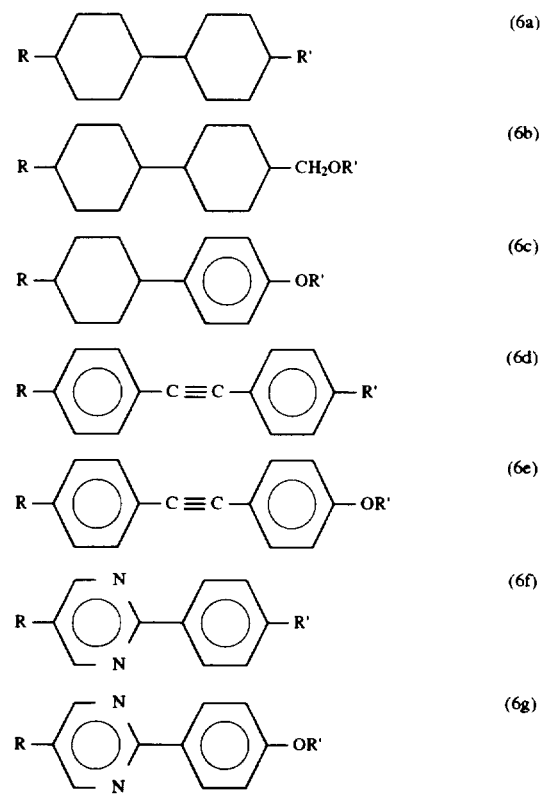

In these formulas, R and R' each independently represent a linear alkyl group of 1 to 10 carbon atoms.

The liquid crystal composition used according to the present invention is prepared according to a process which is conventional by itself, in general, a process of dissolving various components with each other at a high temperature.

The liquid crystal composition used according to the present invention can be also used as a liquid crystal composition for guest-host (GH) mode, by adding a dichroic pigment such as those of merocyanine group, styryl group, azoic group, azomethine group, azoxy group, chinophthalone group, anthraquinone group, tetrazine group, etc. The liquid crystal composition can be also used as a liquid crystal composition for polymer dispersion type liquid crystal display device (PNLCD), represented by NCAP prepared by microcapsulating nematic liquid crystals and polymer network liquid crystal display device (PNLCD) obtained by forming a three-dimensional polymer network in liquid crystals. Besides, it can be also used as liquid crystal compositions for birefringence control (ECB) mode or dynamic scattering (DS) mode.

EXAMPLE

The present invention will be described by way of the following examples, but it should not be construed to be limited thereto.

The composition ratios in the examples all refer to % by weight. The measured temperature of the viscosity refers to 20° C., and those other than that of the viscosity refer to 25° C. The measured wavelength of the optical anisotropy is 589 nm.

$V_{20}/V_{40}$ and the response rate are respectively rectangle wave and 1/240 duty—1/16 bias.

Compounds in Examples were represented by abbreviationa as defined below. Namely, as shown in the following Table, the left terminal groups were shown by a, aO, aOb, Va, aVb and aVbVd; the bonding groups were shown by 2, E, T, V and CF2O; the ring structures were shown by B, B(F), B(F,F), H, Py and Ch; and the right terminal groups were shown by F, CL, C, CF3, OCF3, OCF2H, w, Ow and EMe:

TABLE 1

| Left terminal group | Abbreviation | Bonding group | Abbreviation |
| --- | --- | --- | --- |
| $C_aH_{2a+1}-$ | a— | $-CH_2CH_2-$ | 2 |
| $C_aH_{2a+1}O-$ | aO— | $-COO-$ | E |
| $C_aH_{2a+1}OC_bH_{2b}-$ | aOb— | $-C\equiv C-$ | T |
| $CH_2=CHC_aH_{2b}-$ | Va— | $-CH=CH-$ | V |
| $C_aH_{2a+1}CH=CHC_bH_{2b}-$ | aVb— | $-CF_2O-$ | CF2O |
| $C_aH_{2a+1}CH=CHC_bH_{2b}CH=CHC_dH_{2d}-$ | aVbVd— | | |

| Ring structure | Abbreviation | Right terminal group | Abbreviation |
| --- | --- | --- | --- |
| 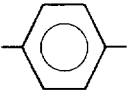 | B | —F | —F |
| 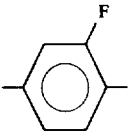 | B(F) | —Cl | —CL |
| 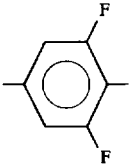 | B(F,F) | —CN | —C |
| 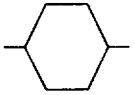 | H | $-CF_3$ | —CF3 |
| 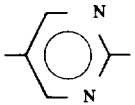 | Py | $-OCF_3$ | —OCF3 |
| 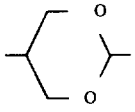 | D | $-OCF_2H$ | —OCF2H |
| 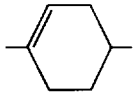 | Ch | $-C_wH_{2w+1}$ | —w |
| | | $-OC_wH_{2w+1}$ | —Ow |
| | | $-COOCH_3$ | —EMe |

Further, as to STN evaluation, liquid crystals were filled in a 240°-twisted cell and steepness (hereinafter defined as $V_{20}/V_{90}$) and response rate (hereinafter defiend as $\pi$) were measured at 25° C. The measured frequencies of the $V_{20}/V_{90}$ and the response rate are 70 $H_z$, and the wave forms of the Further, the chiral dopants used in Examples are shown by the following abbreviations:

[CN] represents:

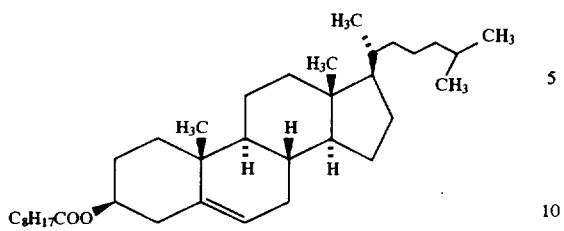

[CM-33] represents:

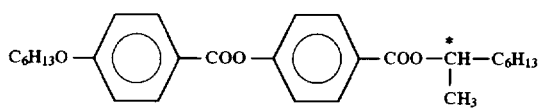

[3HP5*] represents:

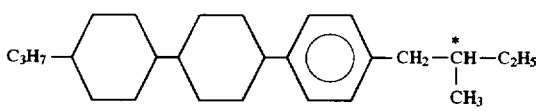

Example 1

A liquid crystal composition was prepared, which consisted of;

as a compound expressed by the formula (1),

| | |
|---|---|
| V2V—HH-3 | 15% | as compounds expressed by the formula (2),

| | |
|---|---|
| V2V—HHB-1 | 15% |
| V2V—HBB-2 | 4% | and as compounds expressed by the formula (3),

| | |
|---|---|
| 3-HB—C | 17% |
| 5-HB—C | 25% |
| V2V—HB—C | 18% |
| V2V—HBB—C | 3% |
| V2V—HHB—C | 3%. |

This composition exhibited the following properties:
clearing point: 85.0° C.
viscosity: 17.4 mpa.s
optical anisotropy: 0.124 V and
threshold voltage: 1.80V When CN (2.00%) was added to the composition, the resulting helical pitch was 12.7 μm; when CM-33 (0.72%) was added thereto, the pitch was 12.5 μm; and when 3HP5* (2.96%) was added thereto, the pitch was 12.7 μm.

When the resulting compositions were measured in a cell having a thickness of 6.5 μm, the $V_{20}/V_{90}$ and the response rate were 1.050 and 270 ms, in either case of adding three kinds of the chiral dopants.

Example 2

A liquid crystal composition was prepared, which consisted of:

as compounds expressed by the formula (1),

| | |
|---|---|
| V2V—HH-3 | 24% |
| V2V—HB-3 | 4%, | as a compound expressed by the formula (2),

| | |
|---|---|
| V2V—HHB-1 | 10% | as compounds expressed by the formula (3),

| | |
|---|---|
| 1 V2-BEB(F,F)—C | 10% |
| 3-HB—C | 18% | as a compound expressed by the formula (4),

| | |
|---|---|
| 3-HHB-3 | 14% and | as compounds expressed by the formula (5),

| | |
|---|---|
| 3-HB(F)TB-2 | 4% |
| 3-HB(F)TB-3 | 4% |
| 3-H2BTB-2 | 4% |
| 3-H2BTB-3 | 4% |
| 3-H2BTB-4 | 4%. |

This composition exhibited a clearing point of 100.4° C., a viscosity of 15.8 mPa.s, an optical anisotropy of 0.133 and a threshold voltage of 2.03 V.

When CN (2.00%) was added to this composition, the resulting helical pitch was 11.6 μm; when CM-33 (0.72%) was added thereto, the helical pitch was 11.4 μm; and when 3HP5* (2.96%) was added thereto, the helical pitch was 11.7 μm. When these compositions were measured in a cell having a cell thickness of 6.0 μm, $V_{20}/V_{90}$ and τ were respectively 1.084 and 230 ms, in either case of adding three kinds of the chiral dopants.

Example 3

A liquid crystal composition was prepared, which consisted of:

as a compound expressed by the formula (1),

| | |
|---|---|
| V2V—HH-3 | 5%, | as a compound expressed by the formula (2),

| | |
|---|---|
| V2V—HHB-1 | 15%, | as compounds expressed by the formula (3),

| | |
|---|---|
| 1V2-BEB (F,F)—C | 8% |
| 3-HB—C | 10% |
| V2V—HB—C | 14% | as a compound expressed by the formula (4),

| | |
|---|---|
| 3-HHB-1 | 10% | as compounds expressed by the formula (5),

| | |
|---|---|
| 3-HB(F)TB-2 | 4% |
| 3-HB(F)TB-3 | 4% |
| 3-H2BTB-2 | 4% |

3-H2BTB-3 4%

3-H2BTB-4 4% and as compounds expressed by the formula (6).

3-HB—O2 7%

3-HH-4 11%.

This composition exhibited a clearing point of 103.2° C., a viscosity of 17.5 mPa.s, an optical anisotropy of 0.136 and a threshold voltage of 2.05 V.

When CN (1.90%) was added to this composition, the resulting helical pitch was 12.2 µm; when CM-33(0.68%) was added thereto, the helical pitch was 12.1 µm; and when 3HP5* (2.80%) was added thereto, the helical pitch was 11.9 µm.

When these compositions were measured in a cell having a cell thickness of 5.9 µm. $V_{20}/V_{90}$ and $\tau$ were respectively 1.066 and 280 ms, in either case of adding three kinds of the chiral dopants.

Example 4

A liquid crystal composition was prepared, which consisted of:

as a compound expressed by the formula (1).

V2V—HH-3 11%, as a compound expressed by the formula (2).

V2V-HBB-2 10% as compounds expressed by the formula (3).

3O1-BEB(F)—C 7%

V2-HB—C 9%

1V2-HB—C 9%

3-HB(F)—C 9%, as compounds expressed by the formula (4).

3-HHB-1 10%

3-HHB—O1 5%

3-HHB—F 5% as compounds expressed by the formula (5).

3-HB(F)TB-3 4%

3-H2BTB-2 4%

3-H2BTB-3 4%

3-H2BTB-4 4%, and as compounds expressed by the formula (6).

3-PyB-2 4%

1O1-HH-3 5%.

This composition exhibited a clearing point of 96.9° C., a viscosity of 18.8 mPa.s, an optical anisotropy of 0.136, and a threshold voltage of 2.21 V.

When CN (2.10%) was added to this composition, the resulting helical pitch was 11.2 µm; when CM-33(0.76%) was added thereto, the helical pitch was 11.1 µm; and when 3HP5* (3.10%) was added thereto, the helical pitch was 11.2 µm. These compositions were measured in a cell having a cell thickness of 5.9 µm. $V_{20}/V_{90}$ and $\tau$ were respectively 1.080 and 250 ms, in either case of adding three kinds of the chiral dopants.

Example 5

A liquid crystal composition was prepared, which consisted of;

as a compound expressed by the formula (1).

V2V—HH-5 17%, as a compound expressed by the formula (2).

V2V—HHB-1 10%, as compounds expressed by the formula (3).

1V2-BEB(F,F)—C 8%,

3-HB—C 20%,

1O1-HB—C 4%,

3-HHB—C 3%,

3-HHB(F)—C 3%, as a compound expressed by the formula (4).

3-HHB-3 10% as a compound expressed by the formula (5).

3-HB(F)TB-2 7%, anc as compounds expressed by the formula (6).

3-PyB—O2 6%

2-BTB-1 6%

2-BTB—O1 6%

The resulting composition exhibited a clearing point o 91.2° C., a viscosity of 20.0 mPa.s and an optical anisotrop) of 1.87 V.

When CN (1.88%) was added to this composition, the resulting helical pitch was 12.7 µm; when CM-33 (0.68% was added thereto, the helical pitch was 12.5 µm; and whei 3HP5* (2.78%) was added thereto, the helical pitch was 12.! µm. When these compositions were measured in a cel having a cell thickness of 5.7 µm. $V_{20}/V_{90}$ and $\tau$ wer respectively 1.065 and 270 ms, in either case of adding thre kinds of the chiral dopants.

Effectiveness of the Invention

As illustrated in the above examples, when the chiral nematic liquid crystals of the present invention is used, it i possible to provide STN-LCD having improve characteristics, superior steepness and rapid response time

What is claimed is:

1. A chiral nematic liquid crystal composition containin as a first component, at least one member of compound expressed by the formula (1)

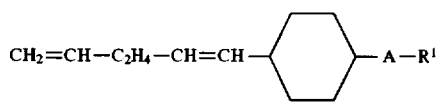

(1)

wherein $R^1$ represents a linear alkyl group of 1 to 10 carbon atoms, and A represents trans-1,4-cyclohexylene or 1,4-phenylene;

as a second component, at least one member of compounds expressed by the formula (2)

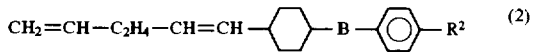

(2)

wherein $R^2$ represents a linear alkyl group of 1 to 10 carbon atoms and B represents trans-1,4-cyclohexylene or 1,4-phenylene, as a third component, at least one member of compounds expressed by the formula (3)

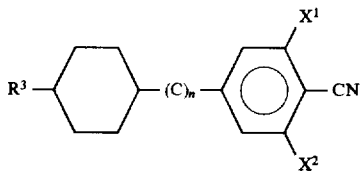

(3)

wherein $R^3$ represents a linear alkyl group of 1 to 10 carbon atoms, or a group wherein an optional —CH$_2$— or two or more not adjacent —CH$_2$—s present in the above group are replaced by —O— or —CH=CH—; $X^1$ and $X^2$ each independently represent H or F; C represents —COO—, —C$_2$H$_4$—, trans-1,4-cyclohexylene or 1,4-phenylene; and n represents 0 or 1, and as a fourth component, a chiral dopant in a quantity in which a ratio (d/p) of the thickness (dμm) of a liquid crystal layer in a liquid crystal cell to be filled with the liquid crystal composition to the helical pitch thereof (pμm) is 0.03 to 2.0.

2. A chiral nematic liquid crystal composition according to claim 1 containing 3 to 70% by weight of the first component, 3 to 50% by weight of the second component, and 3 to 80% by weight of the third component.

3. A chiral nematic liquid crystal composition according to claim 1 or 2, further containing at least one member of compounds expressed by the following formulas (4) to (6):

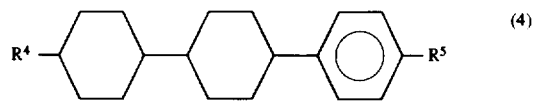

(4)

wherein $R^4$ represents a linear alkyl group of 1 to 10 carbon atoms, a linear alkenyl group of 2 to 10 carbon atoms, a linear alkenyl group of 2 to 10 carbon atoms or a group wherein an optional —CH$_2$— or two or more not-adjacent —CH$_2$—s present in the above groups are replaced by —O—; $R^5$ represents F, a linear alkyl group of 1 to 10 carbon atoms, a linear alkenyl group of 2 to 10 carbon atoms or a group wherein an optional —CH$_2$— or two or more not-adjacent —CH$_2$—s present in the above groups are replaced by —O—,

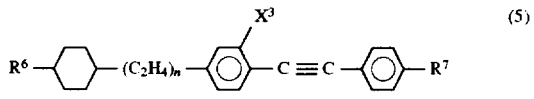

(5)

wherein $R^6$ and $R^7$ each independently represent a linear alkyl group of 1 to 10 carbon atoms; $X^3$ represents H or F; and n represents 0 or 1.

(6)

wherein $R^8$ and $R^9$ each independently represent a linear alkyl group of 1 to 10 carbon atoms or a linear alkenyl group of 2 to 10 carbon atoms; or a group wherein one optional —CH$_2$— or two or more not-adjacent —CH$_2$—s present in the groups are replaced by —O—; D and E each independently represent trans-1,4-cyclohexylene, 1,4-phenylene or 1,3-pyrimidine-2,5-diyl; and n represents 0 or 1.

4. An electro-optic display device containing a chiral nematic liquid crystal composition according to claim 1.

5. An electro-optic display device containing a chiral nematic liquid crystal composition according to claim 2.

6. An electro-optic display device containing a chiral nematic liquid crystal composition according to claim 3.

* * * * *